J. & T. INSULL.

Cupola Furnace.

No. 2,479.

Reissued Feb. 12, 1867.

Witnesses:
William Evans
R. Fitzgerald

Inventors:
John Insull
Thomas + Insull
his mark

N. PETERS. Photo-Lithographer, Washington, D. C.

United States Patent Office.

JOHN AND THOMAS INSULL, OF NEW HAVEN, CONNECTICUT.

*Letters Patent No.* 54,552, *dated May* 8, 1866; *reissue No.* 2,479, *dated February* 12, 1867.

IMPROVEMENT IN CUPOLA FURNACES.

The Schedule referred to in these Letters Patent and making part of the same.

TO ALL WHOM IT MAY CONCERN:

Be it known that we, JOHN INSULL and THOMAS INSULL, of New Haven, in the county of New Haven, and State of Connecticut, have invented a new and improved Cupola Furnace; and we do hereby declare that the following is a full, clear, and exact description thereof, which will enable others skilled in the art to make and use the same, reference being had to the accompanying drawings, forming part of this specification, in which—

Similar letters of reference indicate like parts.

This invention relates to a cupola furnace, which is provided with a hollow hoop or belt, forming an annular air-chamber, communicating by one or more tubes with the fan-blower or other device for creating the requisite blast. From this annular air-chamber the blast is admitted to the interior of the furnace through rectangular or oblong tuyeres, to which access can be had by slides in the outer circumference of the annular air-chamber. One or more horizontal partitions divide said air-chamber in two or more compartments, each provided with a separate blast pipe, so that the blast in either or all the compartments can be used.

Figure 1:
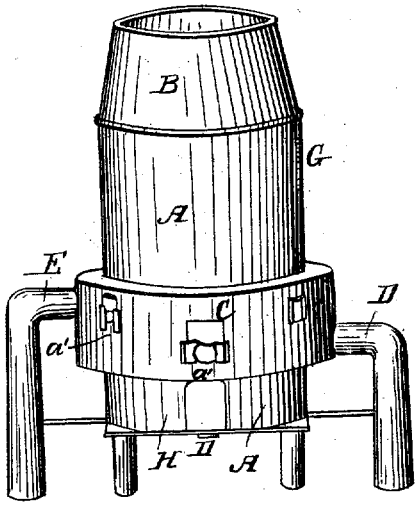
Figure 1 represents a perspective view of this invention.
Figure 2:
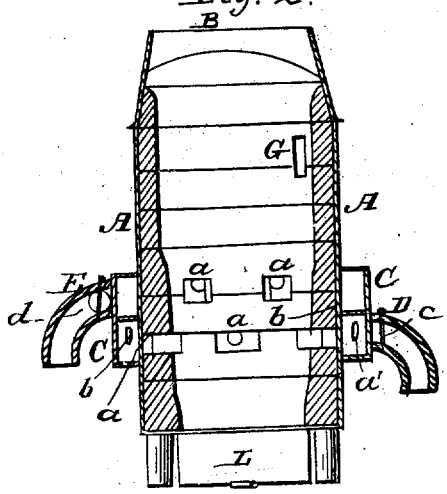
Figure 2 is a vertical central section of the same.

A represents the shell of our furnace, which is made of sheet iron, or any other suitable material, in the form of a cylinder up to within a short distance of its top, B, which is tapering, as clearly shown in the drawing. This shell is provided with a uumber of rectangular or oblong apertures, *a*, for the tuyeres, at a suitable distance above its bottom, and with one or more apertures or doors, G, near its top, where the charges are to be passed in in the usual way. The melted iron is drawn or let out through an aperture or door, H, near the bottom of the shell, and in the bottom is a slag hole which may be closed by a hinged plate, L, attached to the furnace in any suitable way. The tuyere holes *a a* are rectangular or oblong, so that the blast is spread over the largest possible surface, and two or more rows of such holes are used one above the other, and placed in a zigzag position, whereby a more even distribution of the blast is obtained than by any other arrangement of the tuyeres known to us. On the exterior of the shell A, and covering the tuyere holes *a a*, is the annular air-chamber C, which communicates with the fan-blower, or other apparatus for creating a blast, by pipes D E, so that the blast is rendered uniform all round, and the charge of the furnace is heated equally throughout. In the outer wall of the air-chamber C are a number of apertures, *a'*, corresponding in position to the tuyere holes *a a* in the shell A of the furnace, so that easy access can be had to said tuyere holes for the purpose of cleaning. The apertures *a'* are provided with suitable slides, so that they can be opened and closed as may be required. A horizontal partition, *b*, in the interior of the air-chamber, divides the same in two compartments, each of which communicates with its own blast tube, as shown in fig. 2 of the drawing; and by suitable dampers, *c d*, in these blast tubes, the blast can be admitted to the lower or to the upper compartment of the air-chamber, or to both at once, as may appear desirable. In practice, the shell A is lined from bottom to top with fire-brick or any other suitable material, as indicated in section in fig. 2, making the lining in the lower portion considerably thicker to lessen the inside diameter, and, consequently, the capacity of the furnace in that part, to save fuel and to impart to the furnace greater stability.

The operation of our furnace is as follows: We kindle the fire in the usual way by blowing through the blast pipe D, below the partition *b*, till the fire is blown up to the upper tuyeres, (during which time we close the valve *d* in the blast pipe E) and after the fire reaches the upper tuyeres, the valve *d* in the blast pipe E should be opened, and another blast sent in through the pipe E, when the fire may be blown by the two blast pipes B and E up to the desired height and continued at pleasure. In case the partition *b* is not used, the blast may be admitted simultaneously through both blast pipes, or first through one and then through both. When the fire is blown up sufficiently for the purpose, the charges of iron or ore, flux, coal, etc., may be inserted at the upper aperture G in the proper order, quantity, and time, as is usual, or as the judgment may dictate. When a sufficient quantity of iron is melted and all is ready, we tap the furnace at the lower aperture or door H and draw off the charge in the usual way.

What we claim as new, and desire to secure by Letters Patent, is—

1. The annular air-chamber C, in combination with one or more blast pipes, D E, and with the furnace A, constructed and operating substantially as and for the purpose described.

2. The partition *b*, in combination with the annular air-chamber C, blast pipes D E, and furnace A, constructed and operating substantially as and for the purpose set forth.

3. Making the tuyeres oblong, instead of round as usual, for the purpose described.

4. Two or more rows of tuyeres placed at a zigzag position, substantially as and for the purpose set forth.

5. The apertures *a'* in the outer wall of the air-chamber C, in combination with the tuyeres *a*, constructed and operating substantially as and for the purpose described.

JOHN INSULL,
THOMAS INSULL.

Witnesses:
HOADLEY B. IVES,
WILSON H. CLARK.